United States Patent [19]

Banura

[11] Patent Number: 5,252,911

[45] Date of Patent: * Oct. 12, 1993

[54] AC TO DC POWER CONVERTER WITH REGULATED BI-POLAR OUTPUTS

[76] Inventor: George A. Banura, Ridgecrest, Calif.

[*] Notice: The portion of the term of this patent subsequent to Oct. 2, 2007 has been disclaimed.

[21] Appl. No.: 733,488

[22] Filed: Jul. 22, 1991

Related U.S. Application Data

[60] Continuation of Ser. No. 618,323, Nov. 19, 1990, Pat. No. 5,068,596, which is a division of Ser. No. 518,621, May 3, 1990, Pat. No. 5,023,542, which is a division of Ser. No. 389,245, Aug. 3, 1989, Pat. No. 4,961,048.

[51] Int. Cl.$^5$ ............................................. G05F 1/585
[52] U.S. Cl. .................................... 323/351; 323/266; 363/63; 363/81
[58] Field of Search ...................... 363/65, 67, 81, 89, 363/56, 63; 323/266, 267; 307/11, 24, 82

[56] References Cited

U.S. PATENT DOCUMENTS

| | | | |
|---|---|---|---|
| 4,144,463 | 3/1979 | Sugiura | 307/75 |
| 4,740,878 | 4/1988 | Carter et al. | 363/63 |
| 4,916,380 | 4/1990 | Burroughs | 323/282 |
| 4,961,048 | 10/1990 | Banura | 323/351 |
| 5,010,279 | 4/1991 | Lathom | 363/63 |
| 5,023,542 | 6/1991 | Banura | 323/248 |

OTHER PUBLICATIONS

Cogger, "DC to DC Converter Family Packs Power Into Tight Spots," Elect. Design, pp. 81–86, Feb. 19, 1987.

*Primary Examiner*—William H. Beha, Jr.
*Attorney, Agent, or Firm*—Harvey A. Gilbert; Melvin J. Sliwka; John L. Forrest, Jr.

[57] ABSTRACT

A AC to DC power converter unit includes an AC/DC converter section operable to convert an AC input into a plurality of unregulated internal DC outputs and a pair of positive and negative switching DC/DC converter sections connected to said AC/DC converter section and receiving a pair of positive and negative unregulated internal DC outputs therefrom being of a first voltage level and generating a pair of dual positive and negative regulated external DC outputs being of a second voltage level different from said first voltage level.

1 Claim, 7 Drawing Sheets

AC TO DC POWER CONVERTER WITH REGULATED BI-POLAR OUTPUTS

This is a continuation of copending application Ser. No. 07/618,323, filed Nov. 19, 1990, now U.S. Pat. No. 5,068,596, which is a division of Ser. No. 07/518,621, filed May 3, 1990, now U.S. Pat. No. 5,023,542, which is a division of Ser. No. 07/389,245, filed Aug. 3, 1989, now U.S. Pat. No. 4,961,048.

BACKGROUND OF THE INVENTION

1. Field of the Invention

The present invention generally relates to power supplies and, more particularly, is concerned with a power converter unit having high efficiency and reliability.

2. Description of the Prior Art

A new generation of Navy missiles require power supplies of enhanced efficiency and reliability for powering interface functions between the aircraft and missile such as power, audio and fire control. The existing power supplies for Navy missiles have become obsolete in that they do not meet the reliability and power requirements of the new missles. As a result, excessive downtime has been experienced with the existing power supplies.

Consequently, a pressing need exists for design of a new generation of power supplies to handle the- power demands of the new missiles.

SUMMARY OF THE INVENTION

The present invention provides a power converter unit having high efficiency and reliability, making it suitable for powering a missile as well as for other applications. The power converter unit uses state of the art technology to achieve very high efficiency, wide operating temperature range, and very low output ripple and spikes.

The power converter unit contains a pair of switching DC/DC converter sections for positive and negative voltages which incorporate several novel features in accordance with the present invention. One novel feature relates to a MOSFET switching arrangement employed in the DC/DC converter sections of the unit. The novel MOSFET switching arrangement forces series switching elements, preferably two MOSFETs, to share the output load current equally. The MOSFET switching arrangement is optimized at a switching frequency which minimizes spikes while keeping the switches highly efficient.

Another novel feature relates to a current limiting arrangement employed in the DC/DC converter sections of the unit. The novel current limiting arrangement consumes very little power. Prior art designs employ techniques that result in significant power dissipation in the current limiting elements resulting in lower efficiency, more electrical stress, and less reliability. In contrast thereto, the novel current limiting arrangement of the present invention consumes very little power in its capacity as a sense resistor at the specified current load. The novel current limiting arrangement also has fast response and enhanced temperature compensation.

Still another novel feature relates to an internal grounding arrangement employed in the DC/DC converter sections of the unit. The novel grounding arrangement minimizes output of current spikes by isolating the switching spikes from the input and output.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Overview of Power Converter Unit

Figure 1A:
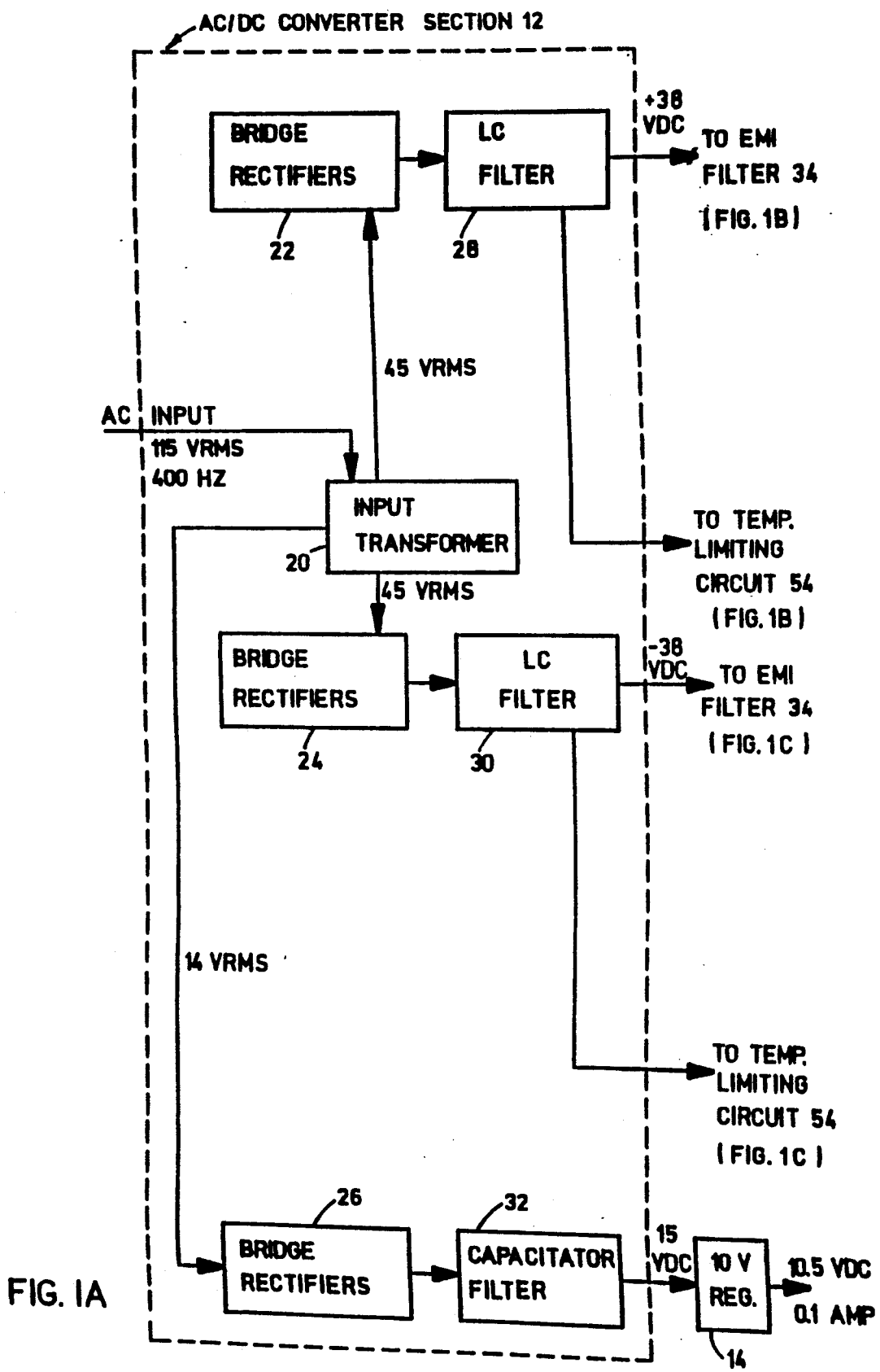
FIGS. 1A–1C are block diagrams of the basic sections making up a power converter unit incorporating several novel features in accordance with the present invention.
Figure 1B:
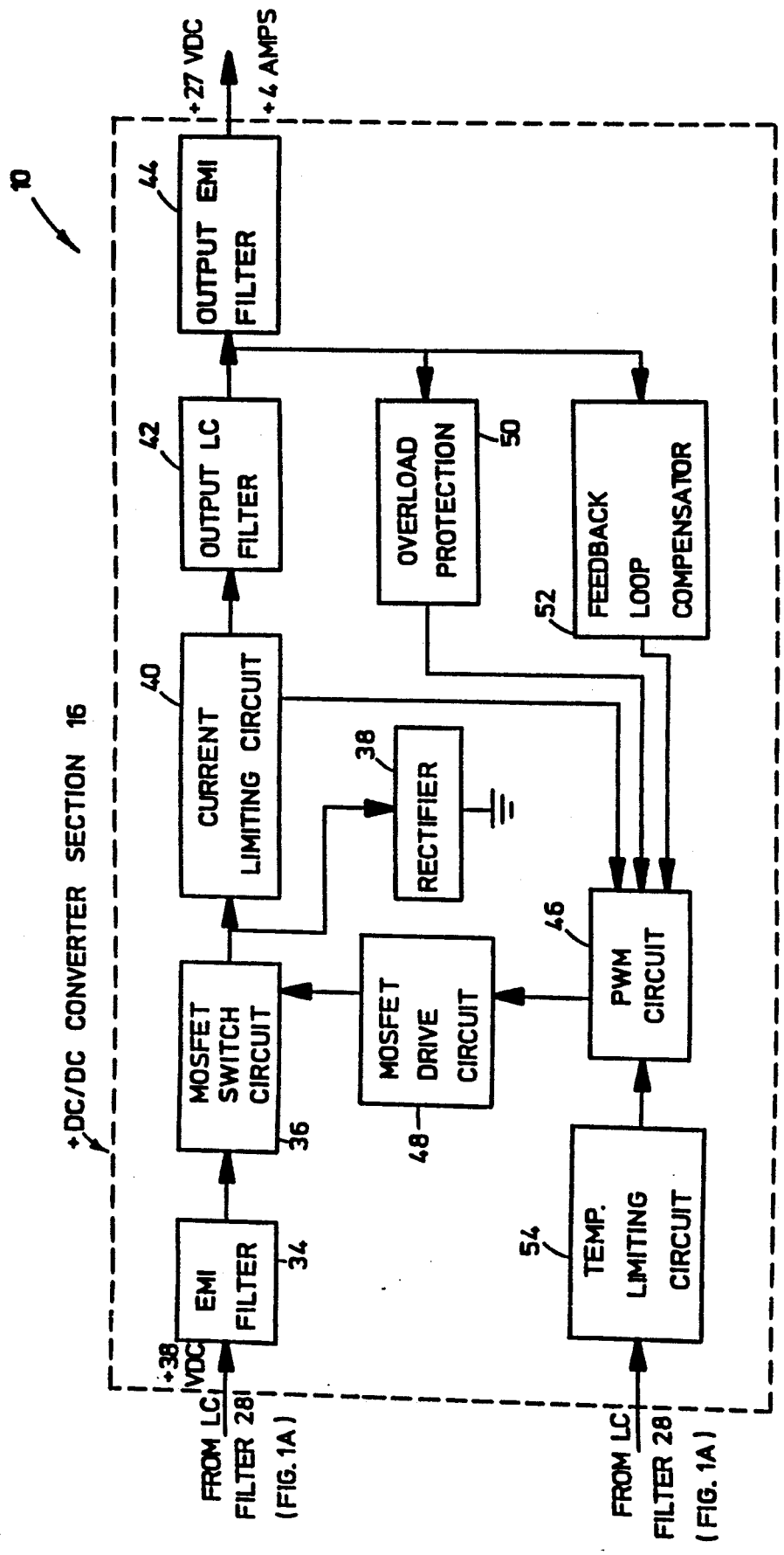
Figure 1C:
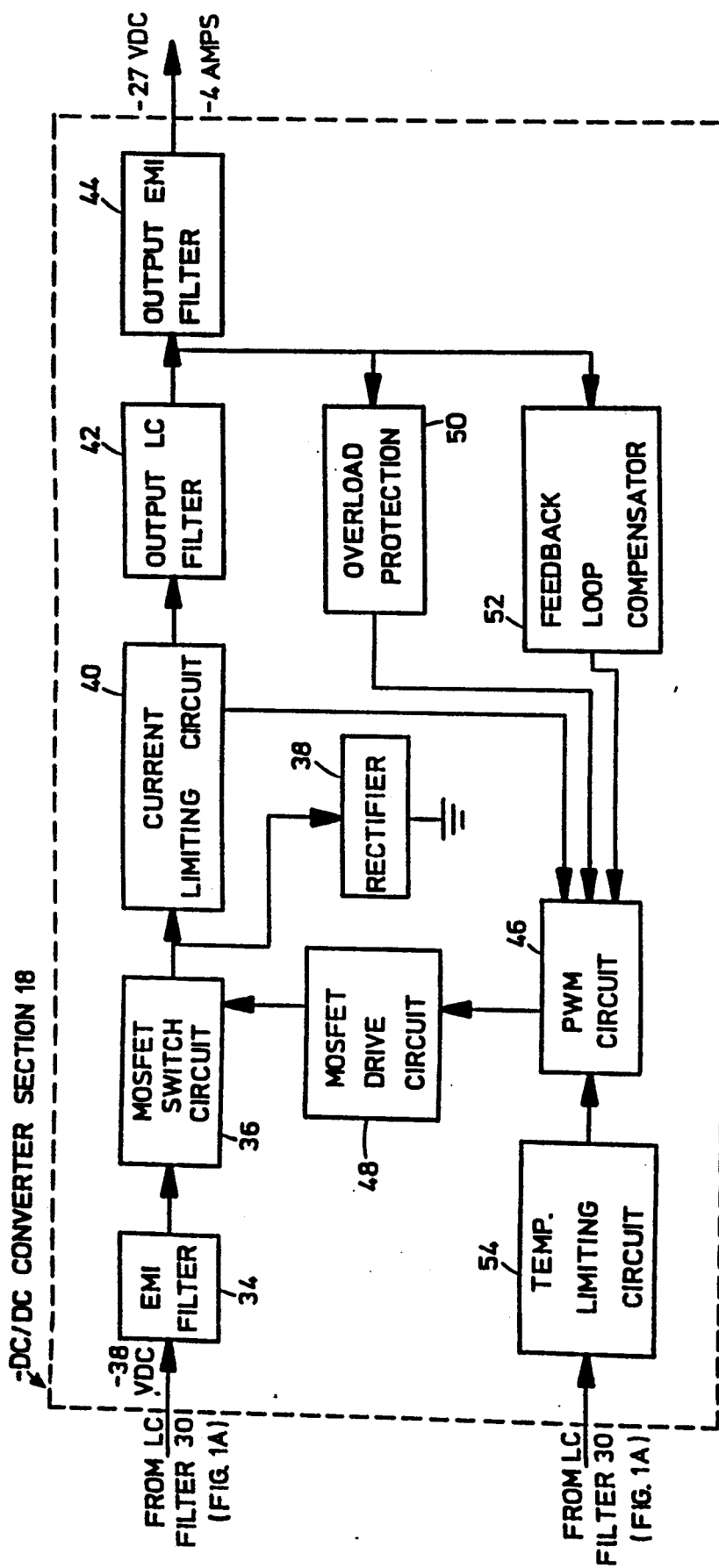

Referring now to the drawings, and particularly to FIGS. 1A–1C, there is illustrated a power converter unit 10. The unit 10 incorporates several novel features in accordance with the present invention which will be described in detail later on with reference to schematic diagrams thereof in FIGS. 2 and 4–6. The overall makeup of the power converter unit 10 will first be described with reference to the block diagrams of FIGS. 1A–1C.

In its basic components, the power converter unit 10 includes an AC/DC converter section 12, shown in FIG. 1A, a DC voltage regulator section 14, also shown in FIG. 1A, and a pair of positive and negative voltage DC/DC converter sections 16 and 18, shown in FIGS. 1B and 1C, respectively. As an example, in the specific application of the illustrated embodiment of the unit 10 as a power supply in the missile launcher for powering a missile, the input AC/DC converter section 12 converts a 115 Vrms AC input at 400 Hz into three unregulated internal output voltages of +38 Vdc, −38 V dc and 15 Vdc, respectively. The 15 Vdc output is inputted to the DC voltage regulator section 14 which generates a regulated internal output voltage of 10 Vdc that is used to provide internal auxiliary power to the DC/DC converters 16 and 18. The +38 Vdc and −38 Vdc voltages at 3.16 Amps are inputted to the respective DC/DC converter sections 16 And 18 for further regulation and control and generation of regulated external output voltages of +27 Vdc at +4 Amps and −27 Vdc at −4 Amps, respectively.

Therefore, the power converter unit 10 is a power supply that accepts an input of 115 Vrms at 400 Hz and converts it into +27 Vdc and −27 Vdc regulated dual outputs with a 4 Amps continuous and 10 Amps surge capability at each of its two outputs. As will become clear below, the +27 Vdc and −27 Vdc outputs are regulated against variations in the input AC voltage and load changes at the outputs.

Referring to FIG. 1A, the AC/DC converter section 12 includes an input step-down power transformer 20, a plurality of full-wave bridge rectifiers 22, 24 and 26 connected in parallel to outputs of the transformer 20, and a plurality of LC and capacitor filters 28, 30 and 32 connected respectively to outputs of the rectifiers 22, 24 and 26. More particularly, the step-down transformer 20 has a primary winding (not shown) and three secondary windings (not shown). A series of bidirectional transient voltage suppressors (not shown) are placed in parallel with the primary winding of the input transformer 20 to provide protection against input overvoltage transients. The full-wave rectifiers 22, 24 and 26 are separately connected across the respective secondary windings of the transformer 20. The respective outputs of the rectifiers 22 and 24 of the AC/DC converter section 12 are supplied to the positive and negative voltage DC/DC converter sections 16 and 18 of the power converter unit 10. The output of the remaining rectifier 26 is supplied to that DC voltage regulator section 14.

The DC voltage regulator section 14 includes an AC/DC converter device (not shown), a current limiter (not shown), and a linear regulator (not shown). The output voltage developed across the capacitor filter 32 of the AC/DC converter section 12 is stepped down through the highly efficient linear regulator of the regulator section 14 which uses a MOSFET as a series power device and contains both over-voltage and over-current protection in producing a constant output voltage. The purpose of the current limiter of the regulator section 14 is to limit the maximum output current to a predetermined safe level.

In the specific example, the input voltage to the primary winding of the step-down transformer 20 is 115 Vrms and the output voltages of the secondary windings of the transformer 20 are 45 Vrms 45 Vrms and 14 Vrms. The two 45 Vrms voltage outputs are independently full-wave rectified by the rectifiers 22 and 24 and filtered by the LC filters 28 and 30, resulting in a pair of unregulated output voltages of +38 Vdc and −38 Vdc. The remaining 14 Vrms output voltage is also full-wave rectified by the rectifier 26 and filtered by the capacitor filter 32, resulting in an unregulated output of 15 Vdc. The DC voltage regulator section 14 receives and regulates the 15 Vdc output from the capacitor filter 32, resulting in an regulated internal output voltage of 10.5 Vdc at 0.1 Amps. This voltage is used as auxiliary power for driving the internal control circuitry of the DC/DC converter sections 16 and 18 of the power converter unit 10. The regulator section 14 provides the 10.5 Vdc voltage as a constant output for an input ranging from 11 Vdc to 40 Vdc.

Referring to FIGS. 1B and 1C, the positive and negative voltage DC/DC converter sections 16 and 18, being substantially the same in makeup and function, each includes an input EMI filter 34, a MOSFET switch circuit 36, a fast recovery rectifier 38, a current limiting circuit 40, and serially connected output LC and EKI filters 42 and 44. Further, the converter sections 16 and 18 each contains a pulse-width modulator (PWM) circuit 46, a MOSFET drive circuit 48, overload protection and feedback loop compensation circuits 50 and 52 and temperature limiting circuit 54.

The function of the input and output EMI filters 34 and 44 of the DC/DC converter sections 16 and 18 is to keep the switching noise inside the converter sections 16 and 18. The filters 34 and 44 each contain a RF choke (not shown) plus high and low frequency capacitive filters (not shown). The PWM voltage regulation loop monitors the input voltage and adjusts the duty cycle of the PWM circuit 46 such that the output voltage is held at a constant value. The PWM voltage regulation loop encompasses the PWM circuit 46, the MOSFET switch circuit 36, and the MOSFET drive circuit 48 that chop the input voltage into a square wave. The PWM voltage regulation loop further includes the freewheeling rectifier 38 that maintains continuous current flow in and an output inductor of the LC filter 42 by turning on when the MOSFETs of the switch circuit 36 turn off, the output LC filter 42 that filters the DC level of the chopped waveform, and the feedback loop compensation circuit 52 that senses the output voltage and frequency-compensates the loop to make it stable. The PWM circuit 46 has an internal voltage reference and an error amplifier that compares the sensed output voltage with the internal reference and adjusts the duty cycle to maintain a constant output voltage.

In the specific example, the DC/DC converters 16 and is of the power converter unit 10 each uses the step down PWM switching configuration to convert the respective +38 Vdc and −38 Vdc input voltages into regulated +27 Vdc and −27 Vdc output voltages. The basic blocks of each converter section 16 and 18—make the DC/DC the PWM circuit 46, the MOSFET switch circuit 36, and the output LC filter 42—make the DC/DC converter sections a chopper followed by an LC smoothing filter. The input voltage is chopped and converted into a square wave whose duty cycle is actual to the ratio of the DC/DC converter section output voltage (27 Vdc) to its input voltage (38 Vdc). The feedback loop compensator 52 continuously adjusts the duty cycle such that the output voltage is held constant at 27 Vdc. The overload protection circuit 50 activates when the output current exceeds 11 Amps while the temperature limiting circuit 54 activates when the internal temperature rises above 120° C. When either protection circuit is activated, the power converter unit 10 enters into a sample/shutdown mode until the overload and temperature drop below a certain safe level.

The switching DC/DC converter sections 16 and 18 of the power converter unit 10 contain several novel features in accordance with the present invention which contribute to improved efficiency and reliability of the unit. These novel features, some briefly mentioned above, will now be described in detail.

MOSFET Switching Arrangement

Figure 2:
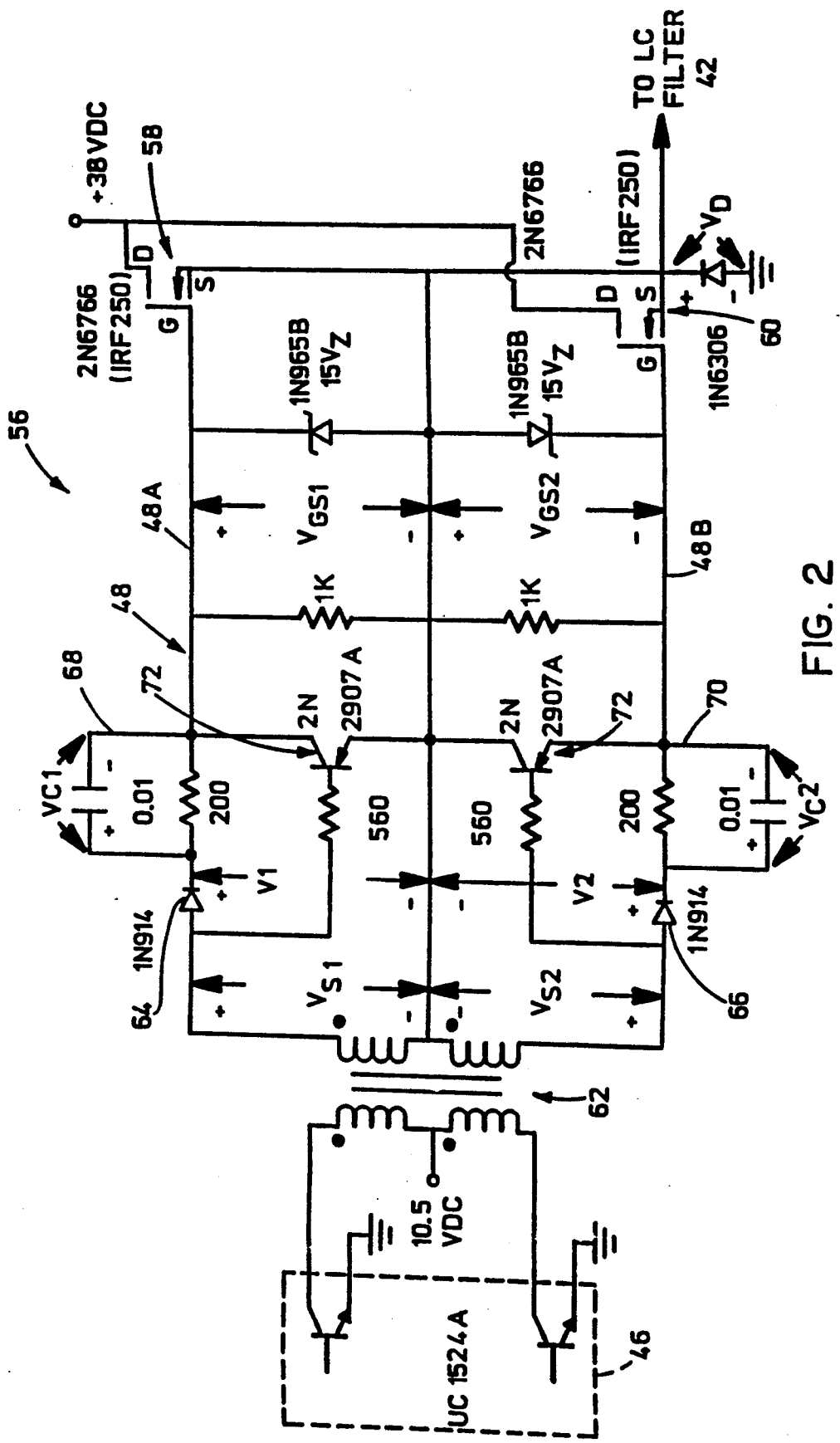
FIG. 2 is a schematic diagram of a MOSFET switching arrangement constituting one novel feature of the present invention employed in the converter unit of FIG. 1.
Figure 3:
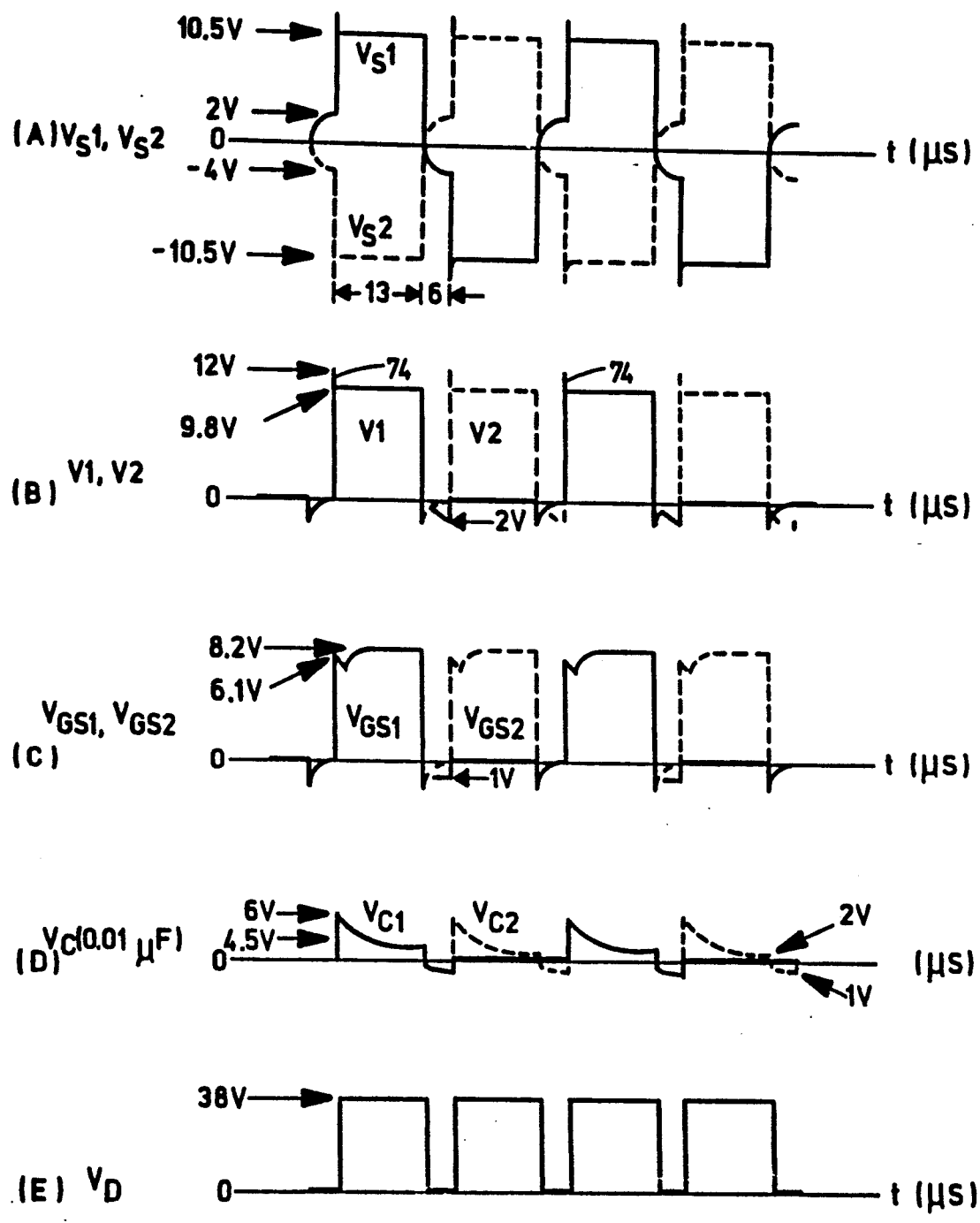
FIG. 3 is a diagram of the waveforms of the MOSFET switching arrangement FIG. 2.

Referring to FIGS. 2 and 3, one novel feature in the power converter unit 10 in accordance with the present invention relates to a MOSFET switching arrangement, generally designated 56, employed in each of the positive and negative voltage DC/DC converter sections 16 and 18 of the unit. In its basic makeup, the MOSFET switching arrangement 56 shown in FIG. 2, includes the MOSFET switch circuit 36 in FIG. 1C, in the form of a pair of MOSFETS 58 and 60 in FIG. 2, having their respective drain (D) and source (S) terminals connected in parallel between the unregulated input and regulated output of the respective DC/DC converter sections 16 and 18. The MOSFET switching arrangement 56 also includes the MOSFET drive circuit 48 which has first and second portions 48A and 48B connected in parallel with one another and in series with the gate (G) terminals of the MOSFETs 58 and 60 for driving the same. The MOSFET switching arrangement 56 further includes means for generating an AC signal to operate the first and second portions 48A and 48B of the drive circuit 48 so as to drive the MOSFETS 58 and 60 in alternating fashion, such that, when one MOSFET 58 is turned on, the other MOSFET 60 is turned off and vice versa. The signal generating weans encompasses the PWM circuit 46 and a transformer 62 which couples the PWM circuit to the MOSFET drive circuit 48. The waveforms of the AC output voltages $V_{s1}$ and $V_{s2}$ across the secondary windings of the transformer 62 are shown in waveform (A) of FIG. 3. The values set forth in the FIG. 2 are part of the example of the illustrated embodiment used in the specific application mentioned above.

The first and second portions 48A and 48B of the MOSFET drive circuit 48 includes current flow control diodes 64 and 66 which prevent passage of the negative portions of the AC signal to the MOSFETs 58 and 60. Adjacent the diodes 64 and 66 are located capacitor and resistor (RC) networks 68 and 70 and transistors 72 for respectively causing substantially instantaneous turn-on and turn-off of the alternately-operated MOSFETs 58 and 60. The output voltages V1 and V2 across the first and second portions 48A and 48B of the MOSFET drive circuit 48 between the locations of the diodes 64 and 66 and RC networks 68 and 70 are shown in waveform (B) of FIG. 3. The capacitors in the respective networks 68 and 70 provide a slightly higher voltage at 74 at the beginning to ensure that the MOSFETs 58 and 60 turn on fast. The transistors 72 turn-on when the signal in waveform (E) of FIG. 3 goes negative and immediately discharge the capacitance of the gate-to-source of the MOSFETs 58 and 60 by providing a short-circuit across the first and second portions 48A and 48B of the MOSFET drive circuit 48.

The voltages $V_{GS1}$ and $V_{GS2}$ in waveform (C) of FIG. 3 are the voltages across the gate-to-source of the MOSFETs 58 and 60. These voltages represent the drive voltage to the MOSFETS. The voltages $V_c$ in waveform (D) FIG. 3 are the voltages across the capacitor of the RC network 68 and 70. The voltages $V_D$ in (E) of FIG. 3 are the voltages at the output of the MOSFETs 58 and 60. The freewheeling rectifier 38 in FIG. 1 prevents creation of a spark when the MOSFETs 58 and 60 are opened by supplying current from ground when the MOSFETs are turned off.

Thus, in the MOSFET switching arrangement 56, the MOSFET drive circuit 48 forces the two MOSFET switches 58 and 60 of the MOSFET switch circuit 36 in FIG. 1 to share the output load current equally by using a push-pull configuration. The MOSFET drive circuit 48 is optimized at a switching frequency which minimizes spikes while keeping the switches highly efficient. The drive circuit results in turn-on and turn-off times of less than 100 nanoseconds.

Current Limiting Arrangement

Figure 4:
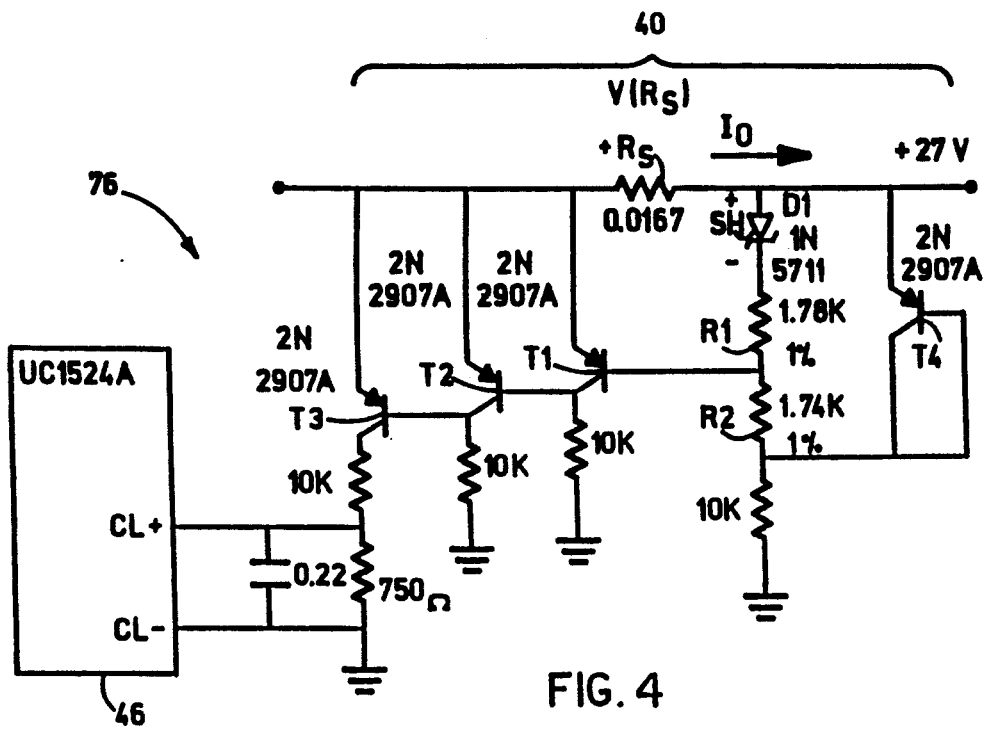
FIGS. 4 and 5 are schematic diagrams of respective current limiting arrangements constituting another novel feature of the present invention employed in the converter unit of FIG. 1.
Figure 5:
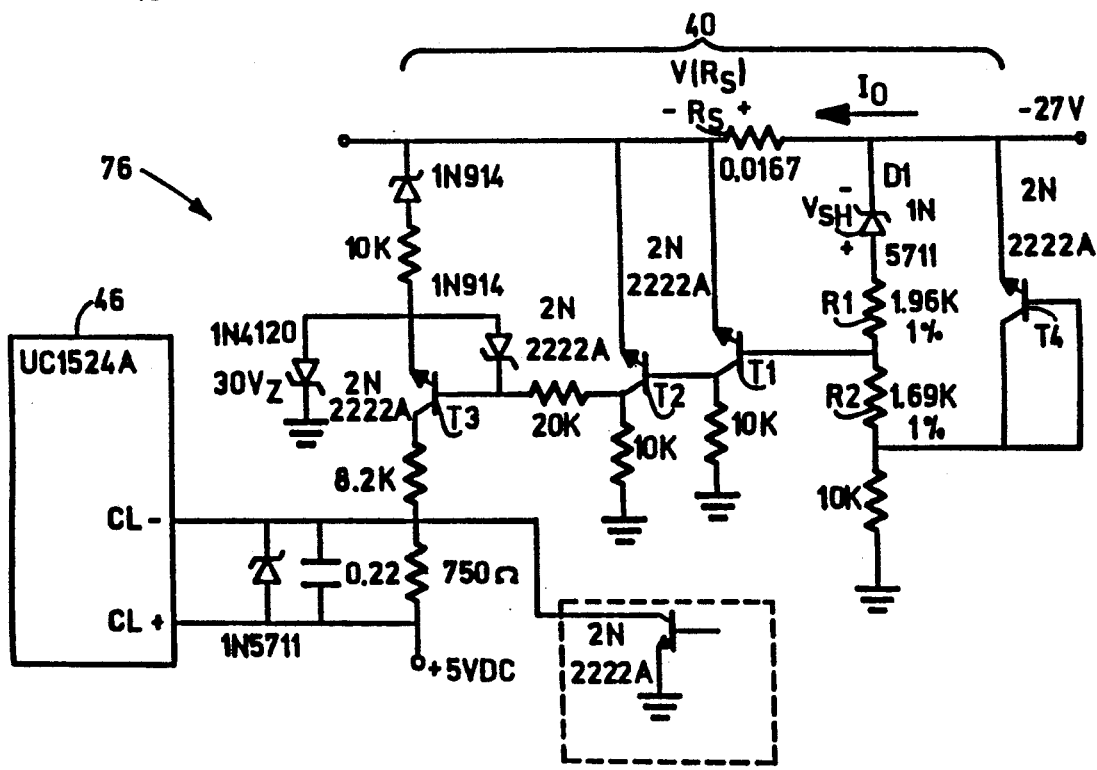

Referring to FIGS. 4 and 5, another novel feature in the power converter unit 10 in accordance with the present invention relates to a current limiting arrangement 76 employed in the DC/DC converter sections 16 and 18 of the power converter unit 10. In its basic makeup, the current limiting arrangement 76 includes the current limit circuit 40 coupled to the PWM circuit 46, as shown in FIG. 1B. The current limit circuit 40 includes a plurality of transistors $T_1$-$T_4$, a current sensing resistor $R_s$, a pair of resistors $R_1$ and $R_2$ and a Schottky diode $D_1$.

Referring to FIGS. 1B and 4, the positive current limiting circuit 40 in the positive DC/DC converter section 16 works as follows (the negative current limiting circuit of FIG. 5 is essentially the complement form of the positive current limiting circuit of FIG. 4 and operates in a similar manner and thus need not be described herein in any greater detail). The transistor $T_4$ is connected as a diode so that it is always turned on and its $V_{BE}$ track the $V_{BE}$ of transistor $T_1$ because they are matched transistors. In view of the fact that transistor $T_4$ is always turned on, $V_{SH} + V(R_1) + V(R_2) = V_{BE}$ of transistor $T_4$. In order for $T_1$ to turn on, $V(R_s) + V_{SH} + V(R_1)$ must equal $V_{BE}$ of transistor $T_1$. However, since the $V_{BE}$ of transistor $T_4$ and of transistor $T_1$ are equal, then transistor $T_1$ turns on when $V(R_s)$ equals $V(R_2)$.

Thus, the voltage, $V(R_2)$, across the resistor $R_2$ serves as the reference threshold voltage against which $V(R_s)$ is compared. The value of $V(R_2)$ is equal to $(V_{BE} - V_{SH})/(1 + R_1/R_2)$. When $V(R_s)$, which equals $I_o \times R_s$, exceeds $V(R_2)$ in response to increase in the current above the desired maximum limit, transistor $T_1$ saturates, transistor $T_2$ cuts off, and transistor $T_3$ saturates and forces $V(CL+)$ to exceed $V(CL-)$ by at least 0.2 Vdc. This immediately shuts down the PWM circuit 46. The current limit $I_i$ is related to the resistor $R_s$ by the following relation:

$$R_s = (V_{BE} - V_{SH})/[I_i(1 + R_1/R_2)].$$

By making $R_1/R_2$ large, the value of $R_s$ becomes very small, thereby reducing the power dissipation $I_o^2 R_s$ and resulting in better efficiency and reliability. The Schottky diode $D_1$ provides temperature compensation so that $(V_{BE} - V_{SH})$ remains relatively constant over temperature extremes.

It should be mentioned that transistors $T_2$ and $T_3$ are for the purpose of sharpening the knee of overcurrent detection. That is, if transistors $T_1I$, $T_2$ and $T_3$ are considered to form a comparator, then the output of the comparator will switch cleanly from one state to another if the current limit is exceeded. Whereas, without transistors $T_2$ and $T_3$, the switching from one to the other state is gradual and sluggish.

The novel arrangement consumes very little power in its capacity as a sense resistor at the specified current load, and also has fast response and enhanced temperature compensation. In the example, the current limiting circuit 40 uses only 16.6 milliohms at the sensor resistor $R_s$ and dissipates only 1.6 Watts at 10 Amp loads. When the output current exceeds 11 Amps, the current limiting circuit 49 is activated and shuts down the PWM circuit 46.

Internal Grounding Arrangement

Figure 6:
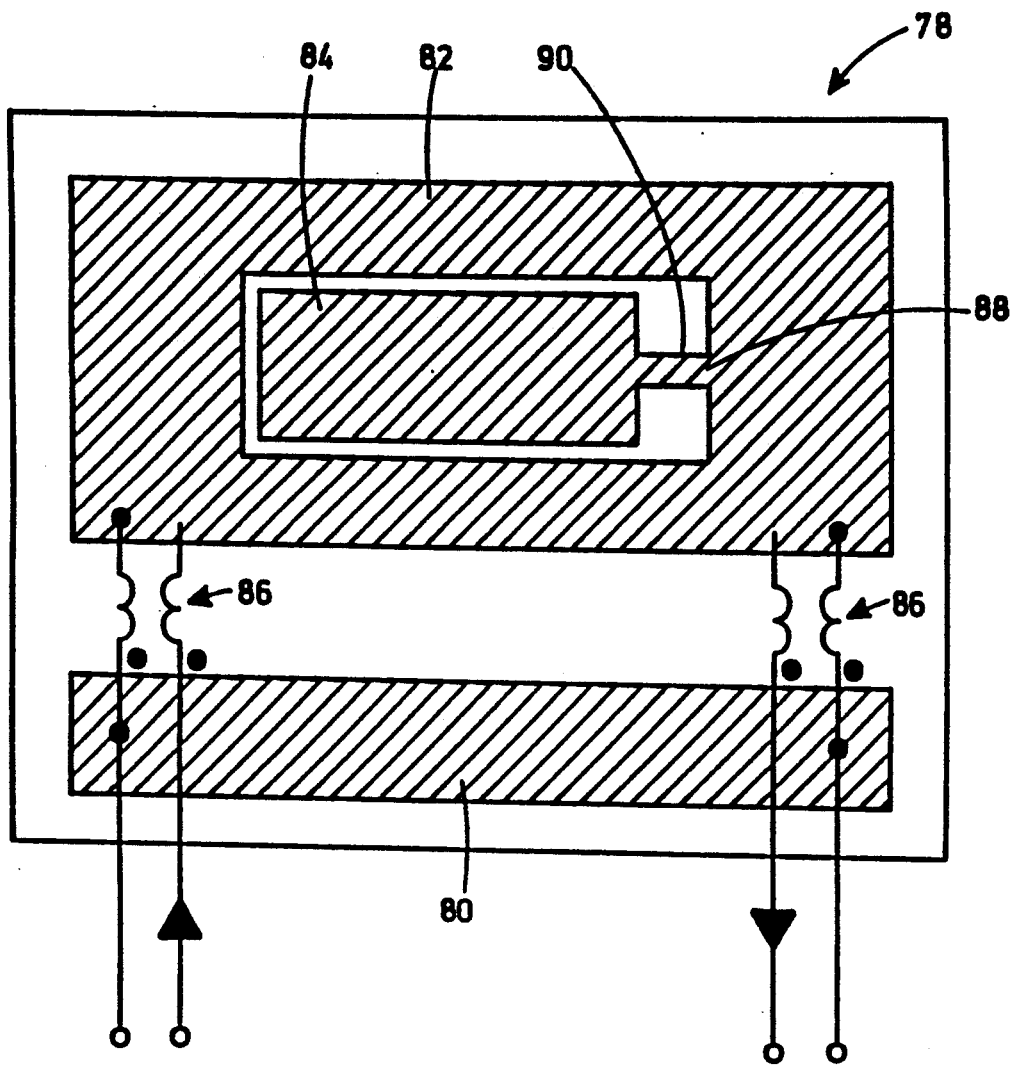
FIG. 6 is a schematic representation of a grounding arrangement constituting still another novel feature of the present invention in the converter unit of FIG. 1.

Referring to FIG. 6, still another novel feature relates to an internal grounding scheme or arrangement 78 in accordance with the present invention employed in the DC/DC converter sections 16 and 18 of the power converter unit 10. The grounding arrangement 78 includes an input/output ground plane 80, a high current switching ground plane 82, and a low current switching ground plane 84.

The input/output ground plane 80 is connected to the external grounds outside of the DC/DC converter sections 16 and 18. It is connected to but isolated from the high current switching ground plane 82 at RF frequencies by ferrite chokes 86. However, the chokes 86 permit unimpeded transmission of DC energy between the ground planes 80 and 82. The high current switching ground plane 82 is used for all high current devices, such as the input/output capacitors of the filters 32, 42 and 44 and the rectifier 38 of the power converter unit 10.

The lower current switching ground plane 84 is used for all lower level control devices, such as the PWM circuit 46 and associated low current switching components. The low current switching ground plane 84 connects to the high current switching ground plane 82 at only one contact location or point 88 to permit operation of the low current switching components with a minimum of interaction with the high current switching components. The connection can be made by any suitable means, such as a single conductor wire 90.

In the actual layout of the power converter unit 10, all low current circuits were located on one board called the control board, and the high current devices were all mounted on a separate board called the power board. The power board contained the input/output ground plane 80 and the high current switching ground plane 82 which were connected by the RF chokes 86.

The novel grounding arrangement thus minimizes output of current spikes by isolating the switching spikes from the input and output.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely a preferred or exemplary embodiment thereof.

What is claimed:
1. An AC to DC power converter, comprising:
   an AC/DC converter section operable to convert an AC input into a plurality of unregulated internal DC outputs; and
   a pair of positive and negative switching DC/DC converter sections connected to said AC/DC converter section and receiving a pair of positive and negative unregulated internal DC outputs therefrom being of a first voltage level and generating a pair of dual positive and negative regulated external DC outputs being of a second voltage level different from said first voltage level,
wherein each of said positive and negative switching DC/DC converter sections has a current limiting arrangement which includes:
   means connected between an input and an output of said switching DC/DC converter section for receiving a flow of current and sensing the voltage between the converter section input and output;
   means coupled to ground voltage and connected between said voltage sensing means and the converter output for establishing a reference threshold voltage;
   a control device operable for shutting down said switching DC/DC converter; and
   a comparator connected to said control device and coupled to said established means and said sensing means, said comparator being operable for comparing the sensed voltage and reference threshold voltage and activating said control device to shut down said switching DC/DC converter when said sensed voltage exceeds said reference threshold voltage.

* * * * *